United States Patent
Zhou et al.

(10) Patent No.: US 12,314,600 B2
(45) Date of Patent: May 27, 2025

(54) COMPLEX PROGRAMMABLE LOGIC DEVICE AND COMMUNICATION METHOD

(71) Applicant: Fulian Precision Electronics (Tianjin) Co., LTD., Tianjin (CN)

(72) Inventors: Xiao-Long Zhou, Tianjin (CN); Li-Wen Guo, Shenzhen (CN)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 79 days.

(21) Appl. No.: 18/126,793

(22) Filed: Mar. 27, 2023

(65) Prior Publication Data

US 2023/0367508 A1  Nov. 16, 2023

(30) Foreign Application Priority Data

May 11, 2022  (CN) .......................... 202210514171.0

(51) Int. Cl.
 *G06F 3/06*   (2006.01)
 *G06F 13/42*  (2006.01)
(52) U.S. Cl.
 CPC ............ *G06F 3/0655* (2013.01); *G06F 3/061* (2013.01); *G06F 3/0673* (2013.01); *G06F 13/4282* (2013.01); *G06F 2213/0016* (2013.01)

(58) Field of Classification Search
 CPC ......... G06F 2213/0016; G06F 9/45558; G06F 13/4282; G06F 13/4286; G06F 3/0673; G06F 3/061; G06F 3/0655
 See application file for complete search history.

(56) References Cited

U.S. PATENT DOCUMENTS

| | | | |
|---|---|---|---|
| 10,430,225 B1 * | 10/2019 | Harland | .............. G06F 9/45558 |
| 2013/0117766 A1 | 5/2013 | Bax et al. | |
| 2016/0117461 A1 | 4/2016 | Yeh et al. | |

* cited by examiner

Primary Examiner — Ernest Unelus
(74) Attorney, Agent, or Firm — ScienBiziP, P.C.

(57) ABSTRACT

The present disclosure provides a complex programmable logic device (CPLD) and a communication method. The CPLD includes a data transmission module, a first in first out (FIFO) memory, and an I²C slave. The data transmission module obtains a first signal of the server, the FIFO memory obtains the first signal transmitted by the data transmission module, and the I²C slave obtains the first signal transmitted by the FIFO memory, so that the baseboard management controller (BMC) reads the first signal from the I²C slave through an I²C bus.

9 Claims, 6 Drawing Sheets

COMPLEX PROGRAMMABLE LOGIC DEVICE AND COMMUNICATION METHOD

FIELD

The present disclosure relates to the field of server technology, in particular to a complex programmable logic device (CPLD) and its communication method with a baseboard management controller (BMC).

BACKGROUND

With the rapid development of the computer and the Internet technology, more and more information may be stored in the server, and the stability of the server becomes more and more important. The BMC communicates with the CPLD on the server through the inter-integrated circuit ($I^2C$) bus to monitor the server, for example, the BMC monitors whether the chassis, the fan, the memory, the processor, the system information, the temperature, the third-party hardware of the server are operating normally. The BMC accesses the CPLD through $I^2C$ bus in a polling way, and the polling way is fixed interval access, which is not real-time and slow response.

Therefore, improvement is desired.

DETAILED DESCRIPTION

In the embodiment of the present disclosure, words such as "first" and "second" are only used to distinguish different objects and cannot be understood as indicating or implying relative importance or indicating or implying order. For example, the first application, the second application, and the like are used to distinguish different applications, not to describe the specific order of applications. The features defined as "first" and "second" can explicitly or implicitly include one or more of these features.

In the description of the embodiments of the present disclosure, the words "exemplary" or "for example" are used as examples, examples or descriptions. Any embodiment or design scheme described as "exemplary" or "for example" in the embodiments of the present disclosure shall not be interpreted as more preferred or advantageous than other embodiments or designs. Specifically, the use of words such as "exemplary" or "for example" is intended to present relevant concepts in a specific way.

Figure 1:
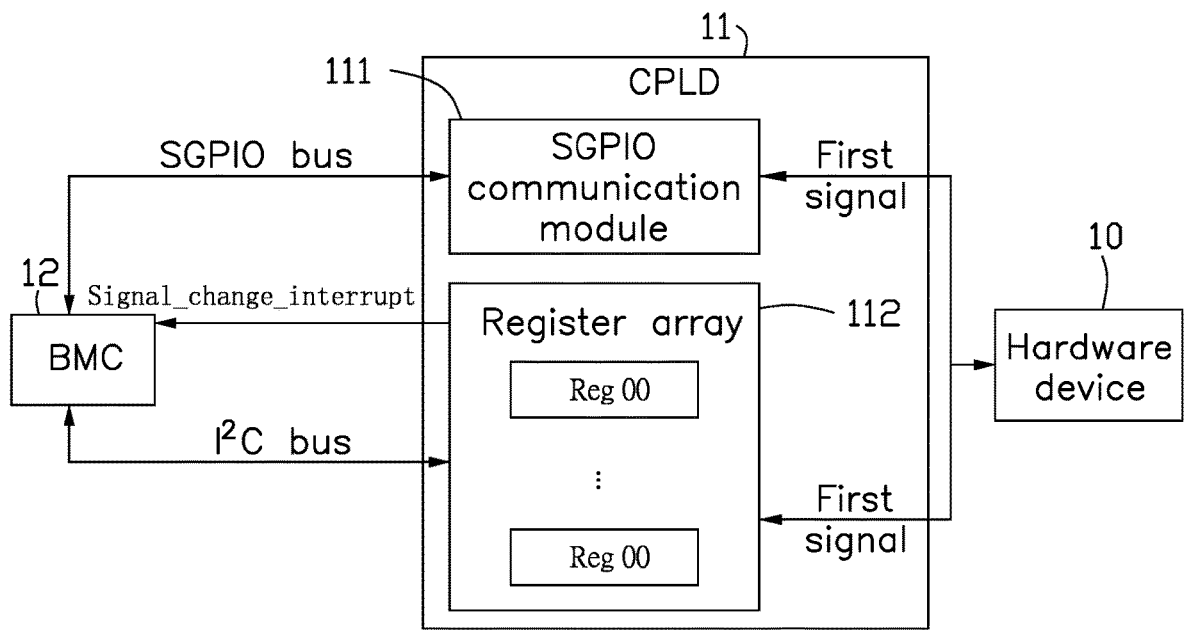
FIG. 1 is a schematic diagram of a communication structure between a BMC and a CPLD according to an embodiment of the present disclosure.

FIG. 1 illustrates a communication structure between a baseboard management controller (BMC) and a complex programmable logic device (CPLD).

In the embodiment, a hardware device 10 is connected to a CPLD 11, and the CPLD is connected to a BMC 12. The hardware device 10 transmits a first signal to the CPLD 11, and the BMC 12 reads the first signal from the CPLD 11. The first signal includes the chassis, the fan, the memory, the processor, the system information, the temperature, the voltage, the board position information, the LED state, the system startup, the shutdown, the reset and other relevant information on the server.

In the embodiment, the BMC 12 is an independent service processor used to manage and monitor each hardware device 10 in the server, for example, including error query, error warning, error reporting and error isolation of the hardware device 10.

In the embodiment, the CPLD 11 is integrated on the motherboard of the server, and the first signal is obtained by the CPLD 11, so as to realize the related functions of on-off timing control, key de-jitter, signal delay and indicator control.

In the embodiment, the CPLD 11 includes a serial general-purpose input/output (SGPIO) communication module 111 and a register array 112. The SGPIO communication module 111 can store the first signal. The SGPIO communication module 111 is connected to the BMC 12 through the SGPIO bus. The BMC 12 can obtain the first signal from the SGPIO communication module 111 through the SGPIO bus.

The register array 112 stores the first signal. The register array 112 is connected to the BMC 12 through the $I^2C$ bus. As shown in FIG. 1, the register array 112 may include 30 registers from Reg00 to Reg29. The CPLD 11 is set as $I^2C$ slave, such as the register array 112 is used as $I^2C$ slave. The BMC 12 (as $I^2C$ host) can communicate with $I^2C$ slave through $I^2C$ bus, that is, the BMC 12 can read and write the first signal on the register array 112 through $I^2C$ bus.

Figure 2:
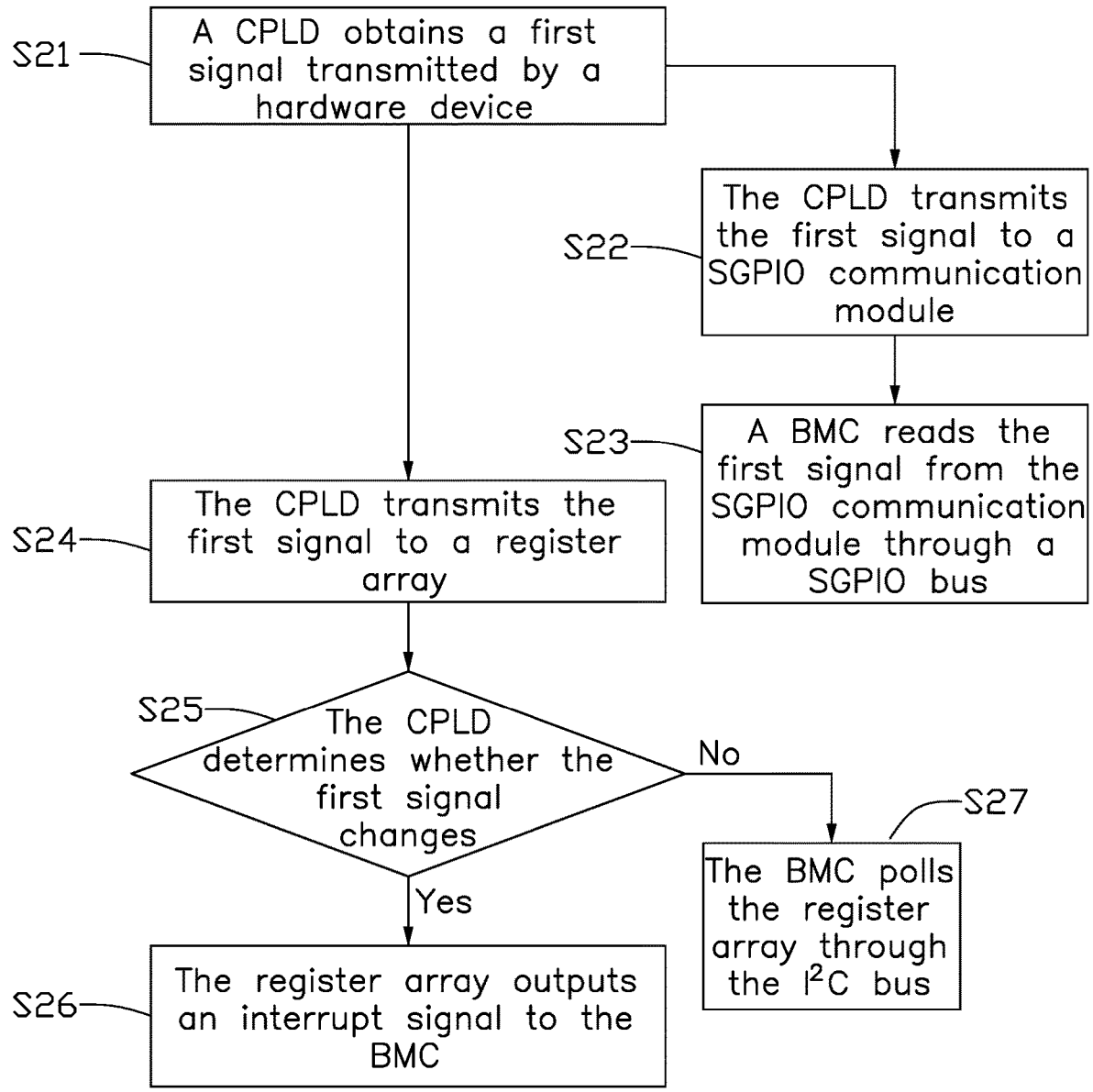
FIG. 2 is a flowchart of a communication method between the BMC and the CPLD according to another embodiment of the present disclosure.

FIG. 2 is a flowchart of a communication method between the BMC and the CPLD. The communication method includes the following steps:

At step S21, the CPLD 11 obtains the first signal transmitted by the hardware device 10.

At step S22, the CPLD 11 transmits the first signal to the SGPIO communication module 111.

At step S23, the BMC 12 reads the first signal from the SGPIO communication module 111 through the SGPIO bus.

At step S24, the CPLD 11 transmits the first signal to the register array 112.

In the embodiment, the register array 112 serves as the $I^2C$ slave, and the CPLD 11 stores the first signal to the register array 112, so that the BMC 12, as the $I^2C$ master, can communicate with the $I^2C$ slave through the $I^2C$ bus, and read and write the first signal on the register array 112.

At step S25, the CPLD 11 determines whether the first signal changes. If the first signal changes, step S26 is implement, otherwise, step S27 is implement.

At step S26, the register array 112 outputs the interrupt signal (the signal_change_interrupt as shown in FIG. 1) to the BMC 12, so that the BMC 12 can immediately read the first signal through the $I^2C$ bus, such as the BMC 12 immediately polls the registers Reg00 to Reg29 in the register array 112 through the $I^2C$ bus to read the first signal.

At step S27, the BMC 12 polls the register array 112 through the $I^2C$ bus.

The BMC 12 communicates with the CPLD 11 to better monitor and manage the server. The communication mode between the BMC 12 and the CPLD 11 directly affects the real-time and reliability of the BMC 12 monitoring server.

The above SGPIO bus can transmit up to 10 bytes in a single cycle, and the data transmitted in a single cycle is limited. During the serial transmission of the SGPIO bus, some signal changes will occur, and these signal changes may be filtered out and lost. For example, in the first cycle, the SGPIO bus transmits the signal A (such as bit), when other signals continue to be transmitted, the signal A changes. When the SGPIO bus transmits the signal A in the next cycle, the signal A has been recovered, and the information about the change of the signal A is filtered out and lost. When communicating through the SGPIO module, there is no mechanism to solve the problem that signals that change between two cycles cannot be transmitted.

Figure 3:
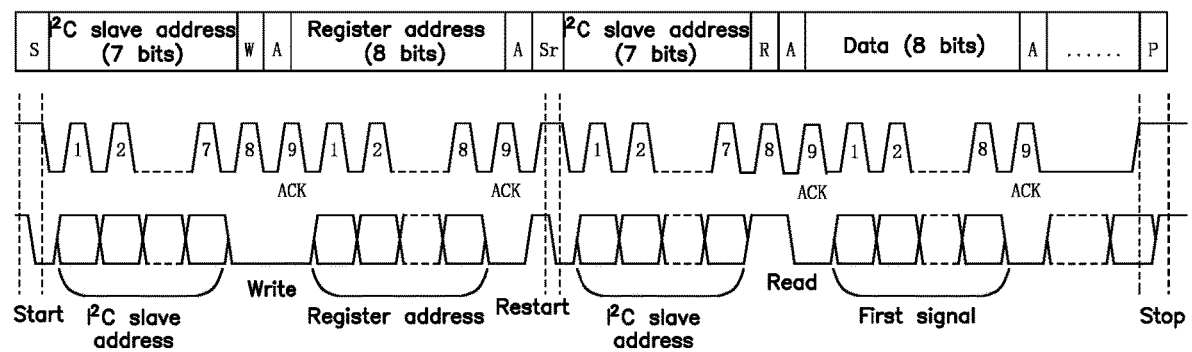
FIG. 3 is a schematic diagram of the BMC reading bytes from the $I^2C$ slave.

The above I²C bus takes a long time to transmit data. FIG. 3 is a schematic diagram of the BMC reading bytes from the I²C slave. As shown in FIG. 3, take the BMC 12 reading 30 bytes of the data from the CPLD 11 as an example, the BMC 12 reads 1 byte of the data, and needs to transmit 38 bits (waveform). It can be understood that reading 30 bytes of the data requires 1140 bits plus 1 stop bit, a total of 1141 bits. The BMC 12 needs 1141 clocks to fully read 30 bytes of the data. When the BMC 12 normally polls the signal (byte) in the CPLD 11, the BMC 12 will also read the interrupt signal, which will occupy more resources of the BMC 12.

In order to solve the above problems, the present disclosure provides another CPLD. Based on the communication between the CPLD and the BMC provided by the embodiment of the present disclosure, it can save the communication time, save the resources of the BMC, and will not lose the signal that changes (jumps) in a short time.

Figure 4:
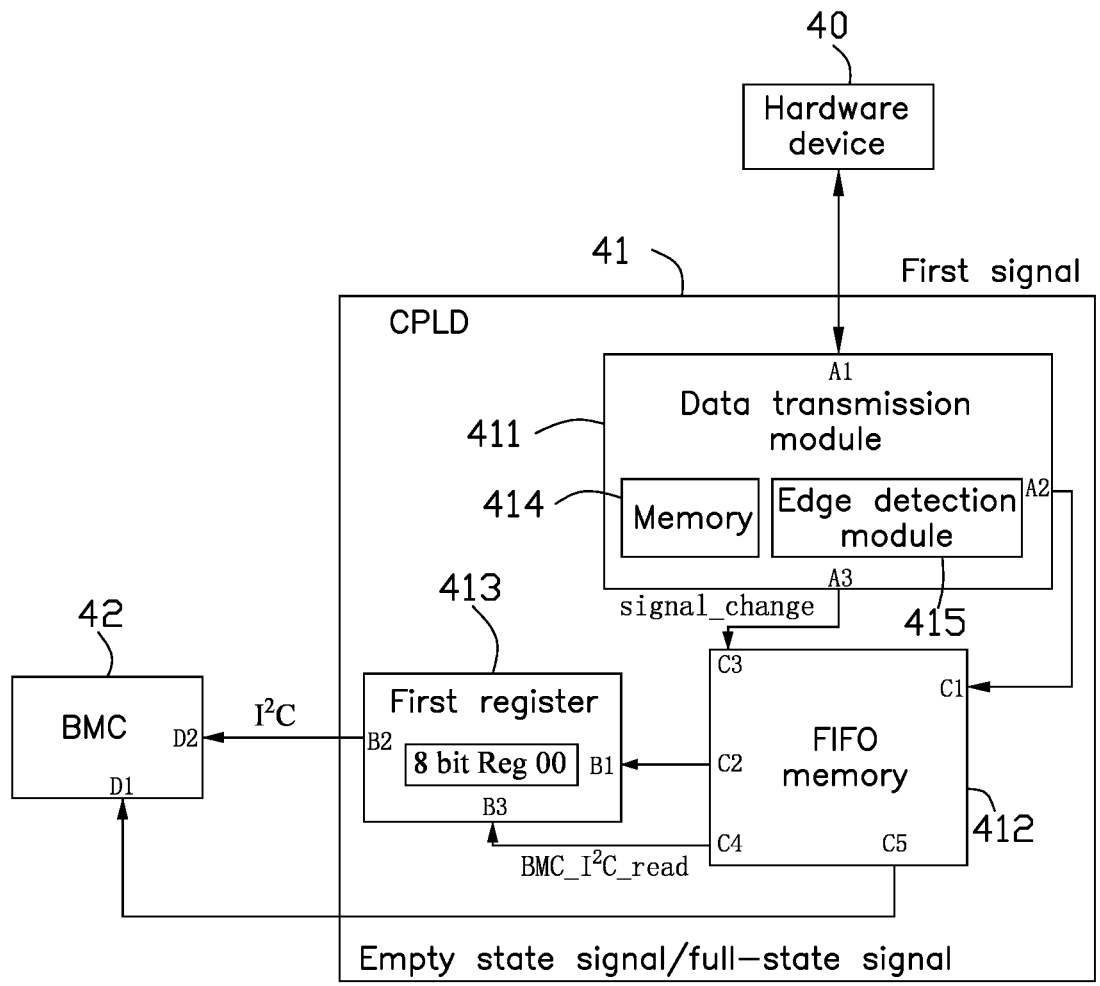
FIG. 4 is a schematic diagram of a communication structure between the BMC and the CPLD according to another embodiment of the present disclosure.

FIG. 4 illustrates a communication structure between a BMC and a CPLD in accordance with another embodiment of the present disclosure.

In the embodiment, the hardware device 40 is connected to the CPLD 41, and the CPLD 41 is connected to the BMC 42. The hardware device 40 transmits the first signal to the CPLD 41, and the BMC 42 reads the first signal from the CPLD 41.

The difference between FIG. 4 and FIG. 1 is that the CPLD 41 includes a data transmission module 411, a first input first output (FIFO) memory 412, and a first register 413.

The data transmission module 411 is connected to the FIFO memory 412, and the FIFO memory 412 is connected to the first register 413. The data transmission module 411 obtains the first signal of the hardware device 40, transmits the obtained first signal to the FIFO memory 412, and stores the first signal in the first register 413 by the FIFO memory 412. The BMC 42 reads the first signal in the first register 413 through the I²C bus.

The data transmission module 411 is used to obtain the first signal transmitted by the hardware device 40 to the CPLD and store the first signal. The data transmission module 411 can connect each hardware device 40 through a connecting line, and then obtain the first signal of each hardware device 40. For example, the data transmission module 411 connects the pins of the processor chip through a connecting line and can directly obtain the first signal output by the processor chip.

In the embodiment, the data transmission module 411 includes a memory 414, and the memory 414 stores the first signal. The memory 414 is divided into many blocks in advance. The data transmission module 411 performs distributed processing on the first signal and stores it in a block preset by the memory 414. The memory 414 may be a random-access memory (RAM), for example, distributed RAM or block RAM.

In the embodiment, the memory 414 in the data transmission module 411 is divided into N blocks, and the first signal is stored in the N blocks. The data transmission module 411 sets an index byte for each block, and the index byte is used for the index block. The BMC 42 knows which block of the data is being read according to the index byte. For example, as shown in Table 1, the memory 414 is divided into 6 RAM blocks (Block0~Block5), each block includes 6 bytes (Byte0~Byte5).

TABLE 1

| Block0 | Byte0 (index byte) | Byte1 | Byte2 | Byte3 | Byte4 | Byte5 |
| Block1 | Byte0 (index byte) | Byte1 | Byte2 | Byte3 | Byte4 | Byte5 |
| Block2 | Byte0 (index byte) | Byte1 | Byte2 | Byte3 | Byte4 | Byte5 |
| Block3 | Byte0 (index byte) | Byte1 | Byte2 | Byte3 | Byte4 | Byte5 |
| Block4 | Byte0 (index byte) | Byte1 | Byte2 | Byte3 | Byte4 | Byte5 |
| Block5 | Byte0 (index byte) | Byte1 | Byte2 | Byte3 | Byte4 | Byte5 |

Byte0 is the index byte. For example, set index bytes for each RAM block (Block0~Block5) in Table 1 above, as shown in Table 2.

TABLE 2

| Index byte value | definition |
| --- | --- |
| 0x00 | Block0 |
| 0x01 | Block1 |
| 0x02 | Block2 |
| 0x03 | Block3 |
| 0x04 | Block4 |
| 0x05 | Block5 |

As can be seen from Table 2, if the index byte value read in Byte0 is 0x00, it indicates that the block currently read is Block0 if the index byte value read in Byte0 is 0x05, it indicates that the currently read block is Block5.

In the embodiment, the data transmission module 411 further includes an edge detection module 415, the edge detection module 415 communicates with the memory 414, and the edge detection module 415 can access the data stored in the memory 414. The edge detection module 415 is used to detect whether the first signal changes. The change of the first signal can be the change of the first signal stored by the data transmission module 411. For example, if the edge detection module 415 detects the edge of the signal from high level to low level, or the edge detection module 415 detects the edge of the signal from low level to high level, it is determined that the signal changes, and the edge detection module 415 outputs an enable signal (such as signal_change in FIG. 4), the enable signal is used to indicate the change of the first signal.

In the embodiment, the data transmission module 411 includes an input terminal A1, an output terminal A2 and a write control terminal A3. The input terminal A1 is used to receive the first signal of the hardware device 40, the output terminal A2 is used to output the first signal, and the write control terminal A3 is used to output the enable signal.

The first register 413 has the functions of receiving signals, storing signals and outputting signals. The first register 413 can be implemented as an I²C slave, and the first register 413 is used to communicate with the BMC 42 through the I²C bus.

For example, the first register 413 can be an 8-bit register (such as 8-bit Reg00 in FIG. 4).

The first register 413 includes a first port B1, a second port B2 and a read control terminal B3. The first port B1 is used to receive the first signal, the second port B2 is used to output the first signal, and the read control terminal B3 is used to output the read signal (for example, BMC_I²C_read in FIG. 4).

The FIFO memory 412 is used to store the first signal. The FIFO memory 412 is a first-come-first-served service mode: the work in the queue will be completed first, and the work in the queue must wait.

For example, the FIFO memory 412 stores bytes as shown in Table 3.

TABLE 3

| Byte n | |
|---|---|
| ... | |
| Byte 23 | Block0 Byte5 |
| Byte 22 | Block0 Byte4 |
| Byte 21 | Block0 Byte3 |
| Byte 20 | Block0 Byte2 |
| Byte 19 | Block0 Byte1 |
| Byte 18 | Block0 Byte0 (index byte 0x00) |
| Byte 17 | Block2 Byte5 |
| Byte 16 | Block2 Byte4 |
| Byte 15 | Block2 Byte3 |
| Byte 14 | Block2 Byte2 |
| Byte 13 | Block2 Byte1 |
| Byte 12 | Block2 Byte0 (index byte 0x02) |
| Byte 11 | Block3 Byte5 |
| Byte 10 | Block3 Byte4 |
| Byte 09 | Block3 Byte3 |
| Byte 08 | Block3 Byte2 |
| Byte 07 | Block3 Byte1 |
| Byte 06 | Block3 Byte0 (index byte 0x03) |
| Byte 05 | Block2 Byte5 |
| Byte 04 | Block2 Byte4 |
| Byte 03 | Block2 Byte3 |
| Byte 02 | Block2 Byte2 |
| Byte 01 | Block2 Byte1 |
| Byte 00 | Block2 Byte0 (index byte 0x02) |

As can be seen from Table 3, the number of bytes stored in the FIFO memory 412 is variable. The edge detection module 415 in the data transmission module 411 detects that the signal in the memory 414 has changed, and then transmits the block of the changed signal to the FIFO memory 412. If the signal in a block changes continuously, the data transmission module 411 can store 6 bytes in the block (such as Block2) into the FIFO byte for many times. Take the FIFO memory 412 can store 30 bytes as an example, Byte n in Table 3 can be Byte 29.

In the embodiment, the FIFO memory 412 includes a data input port C1, a data output port C2, a write permission port C3, a read permission port C4, and a FIFO state port C5. The data input port C1 is used to receive data (such as the first signal, that is, the changed signal). In some embodiments, the data input port C1 is used to receive the block where the first signal is located, for example, if Byte 2 and Byte 3 in Block 2 change, the whole Block 2 will be transferred to the FIFO memory 412. The data output port C2 is used to output the data stored in the FIFO memory 412 (such as the first signal that changes). The write permission port C3 is used to control the write operation of the FIFO memory 412. The read permission port C4 is used to control the read operation of the FIFO memory 412. The FIFO state port C5 outputs the current state of the FIFO memory 412, as shown in FIG. 4, a full-state signal FIFO_almost_full, an empty state signal FIFO_empty).

The input terminal A1 of the data transmission module 411 is connected to the hardware device 40, and the output terminal A2 of the data transmission module 411 is connected to the data input port C1 of the FIFO memory 412. The write control terminal A3 of the data transmission module 411 is connected to the write permission port C3 of the FIFO memory 412, the data output port C2 of the FIFO memory 412 is connected to the first port B1 of the first register 413. The read permission port C4 of the FIFO memory 412 is connected to the read control terminal B3 of the first register 413, the FIFO state port C5 of the FIFO memory 412 is connected to the first terminal D1 of the BMC 42, the second port B2 of the first register 413 is connected to the second terminal D2 of the BMC 42.

In the embodiment, the data transmission module 411 receives the first signal of the hardware device 40 through the input terminal A1. When the data transmission module 411 detects the change of the first signal in the memory 414, the data transmission module 411 outputs the enable signal (signal_change) through the write control terminal A3 to the write permission port C3 of the FIFO memory 412, after the write permission port C3 of the FIFO memory 412 receives the enable signal (signal_change), the FIFO memory 412 can allow the data transmission module 411 to write data (such as the block corresponding to the first signal) to the FIFO memory 412. The data transmission module 411 transmits the block corresponding to the first signal to the data input port C1 of the FIFO memory 412 through the output terminal A2, or, when powering on, the data transmission module 411 outputs the enable signal (signal_change) through the write control terminal A3 to the write permission port C3 of the FIFO memory 412, thereby allowing the data transmission module 411 to write data to the FIFO memory 412. When powering on, the BMC 42 transmits the I²C slave address to the corresponding I²C slave, so that the corresponding I²C slave reads data from the FIFO memory 412.

The FIFO memory 412 outputs the full-state signal FIFO_almost_Full and the empty state signal FIFO_empty to the first terminal D1 of the BMC through the FIFO state port C5. If the BMC 42 receives the empty state signal FIFO_empty, the BMC 42 is in an idle state, it does not call the I²C bus to read the first signal in the first register 413. If the BMC 42 receives the full-state signal FIFO_almost_full, the BMC 42 immediately calls the I²C bus to read the first signal in the first register 413, that is, the block where the first signal is located, the first register 413 outputs the read signal (BMC_I²C_read) through the read control terminal B3 to the read permission port C4 of the FIFO memory 412, after the FIFO memory 412 receives the read signal (BMC_I²C_read), it can allow the first register 413 to read data (such as the first signal or the block where the first signal is located) from the FIFO memory 412 through the first port B1. After the first register 413 reads the data, the BMC 42 can read the data from the first register 413. If the BMC 42 does not receive the full-state signal FIFO_almost_full and the empty state signal FIFO_empty, the BMC 42 can know that the FIFO memory 412 is not full.

Figure 5:
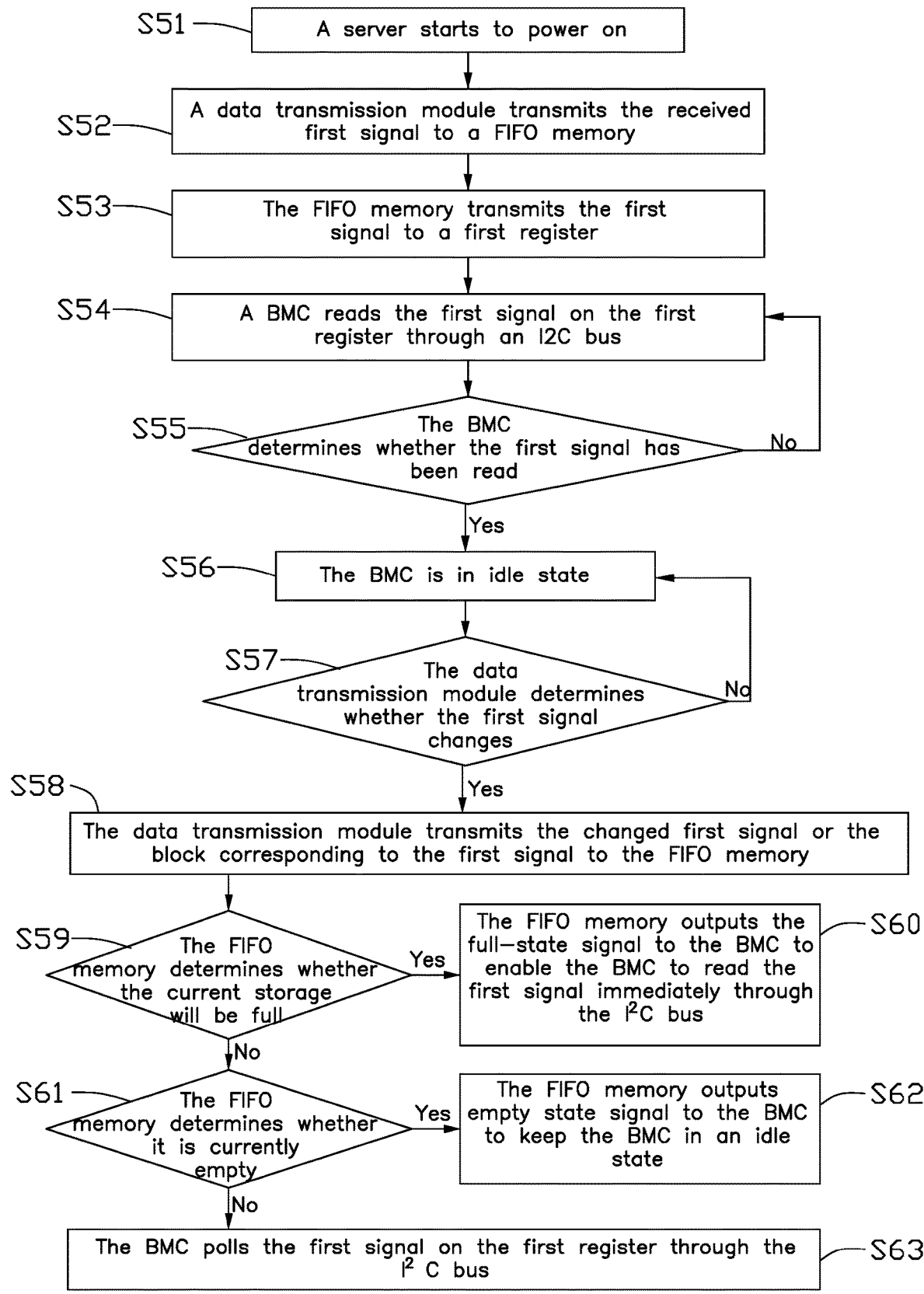
FIG. 5 is a flowchart of a communication method between the BMC and the CPLD shown in FIG. 4.

FIG. 5 is a flowchart of a communication method between the BMC and the CPLD in accordance with an embodiment of the present disclosure. The communication method includes the following steps:

At step S51, the server starts to power on.

At step S52, the data transmission module 411 transmits the received first signal to the FIFO memory 412.

In the embodiment, when the server is powered on, the data transmission module 411 places the first signal or the block where the first signal is located in the FIFO memory 412 in sequence, the FIFO memory 412 is a first-come-first-served service mode: the work in the queue will be completed first, and the work in the queue must wait, therefore, the BMC 42 always reads the outermost byte of the FIFO memory 412 first.

At step S53, the FIFO memory 412 transmits the first signal to the first register 413.

In the embodiment, when the server is powered on, the data transmission module 411 transmits all the first signals obtained to the FIFO memory 412.

In some embodiments, the data transmission module 411 transmits the whole block of the first signal obtained to the FIFO memory 412.

At step S54, the BMC 42 reads the first signal on the first register 413 through the I$^2$C bus.

In the embodiment, when the server is powered on, the BMC 42 will poll the CPLD 41 through the I$^2$C bus, and the CPLD 41 will transfer almost all information of the FIFO memory 412 to the BMC 42.

The BMC 42 reads the first signal on the first register 413 through the I$^2$C bus, including the following steps:

At step 1, the BMC 42 transmits the I$^2$C slave address to the corresponding I$^2$C slave.

The BMC 42 transmits the slave address (such as 0001xx0) of the I$^2$C slave on the CPLD 41 to the I$^2$C slave (the first register 413) on the CPLD 41.

At step 2, the I$^2$C slave responds to the I$^2$C slave address and transmits the read signal to the FIFO memory 412.

After the first register 413 receives the I$^2$C slave address belonging to it, the first register 413 outputs the read signal (BMC_I$^2$C_read) to the FIFO memory 412.

At step 3, the FIFO memory 412 transmits the obtained first signal to the first register 413.

After receiving the read signal from the FIFO memory 412, the first register 413 is allowed to read the first signal or read the block of the first signal from the FIFO memory 412 in turn, and the first register 413 first reads the data stored in the FIFO 412 by the data transmission module 411. For example, if the first stored data Byte 00 in Table 3 is Block2 Byte® (index byte 0x02), the first register 413 reads and retrieves Block2 Byte® first, and then reads and retrieves Block2 Byte1, until the data corresponding to Byte n is read.

At step 4, the BMC 42 reads the first signal on the I$^2$C slave through the I$^2$C bus.

The BMC 42 reads the first signal or the block of the first signal on the first register 413 through the I$^2$C bus.

At step S55, the BMC 42 determines whether the first signal has been read. If the first signal has been read, step S56 is implement, otherwise returns to step S54.

If the first register 413 has read the first signal in the FIFO memory 412, the FIFO memory 412 will output the empty state signal FIFO_empty to the BMC 42. If the BMC 42 does not receive the empty state signal FIFO_empty, the BMC 42 determines that the first signal has not been read.

At step S56, the BMC 42 is in idle state.

The BMC 42 receives the empty state signal FIFO_empty output by the FIFO memory 412, the BMC 42 will no longer call the I$^2$C bus to read the first signal on the first register 413, If the first signal has not been read, the BMC 42 continues to read the first signal or the block of the first signal on the first register 413 through the I$^2$C bus.

At step S57, the data transmission module 411 determines whether the first signal changes. If the data transmission module 411 determines that the first signal changes, step S58 is implement, otherwise returns to step S56.

At step S58, the data transmission module 411 transmits the changed first signal or the block corresponding to the first signal to the FIFO memory 412.

For example, if the data transmission module 411 detects that a signal of Byte2 in Block2 changes from high to low, the data transmission module 411 transfers Byte0 to Byte5 bytes in Block2 to the FIFO memory 412.

In the embodiment, the data of the block in the data transmission module 411 is put into the FIFO memory 412 in the following two cases:

Case 1: when the server is powered on for the first time, all blocks in the data transmission module 411 will be placed in the FIFO memory 412 in sequence.

Case 2: When the data (such as a bit) in a block (such as Block2) in the data transmission module 411 is changed, the data (such as Byte0~Byte5 in Block2) in this block (Block2) are written into the FIFO memory 412.

At step S59, the FIFO memory 412 determines whether the current storage will be full. If the FIFO memory 412 determines that the current memory will be full, step S60 is implement, otherwise step S61 is implement.

At step S60, the FIFO memory 412 outputs the full-state signal FIFO_almost_full to the BMC 42 to enable the BMC 42 to read the first signal immediately through the I$^2$C bus.

The FIFO memory 412 can store up to 30 bytes, and can also store up to 10 bytes, which is not specifically limited in this disclosure. If the FIFO memory 412 can store up to 30 bytes, when the FIFO memory 412 has stored 29 bytes of data, the FIFO memory 412 outputs the full-state signal FIFO_almost_full to the BMC 42.

At step S61, the FIFO memory 412 determines whether it is currently empty. If the FIFO memory 412 determines that it is currently empty, step S62 is implement, otherwise step S63 is implement.

At step S62, the FIFO memory 412 outputs empty state signal FIFO_empty to the BMC 42 to keep the BMC 42 in an idle state.

At step S63, the BMC 42 polls the first signal on the first register 413 through the I$^2$C bus.

Figure 6:
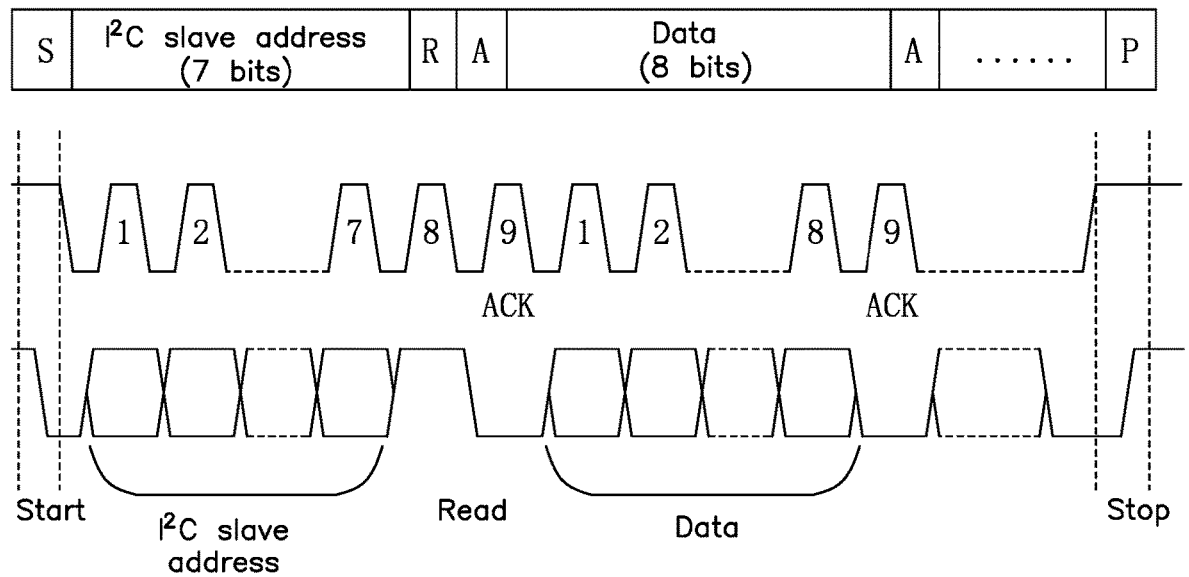
FIG. 6 is a schematic diagram of the BMC reading bytes from the $I^2C$ slave.

Referring to FIG. 6, if the FIFO memory 412 is empty, it means that the BMC 42 does not read data from the CPLD 41, and the BMC 42 needs 0 clock to read data. If the FIFO memory 412 is not empty, for example, the FIFO memory 412 stores two blocks, the BMC 42 reads two blocks from the CPLD 41. The BMC 42 reads the data of two blocks, it needs to transmit 1 byte of address (the first register 413 is used as the I$^2$C slave), plus 2 bytes of index, plus 10 bytes of data, plus 13 ACK bits, plus 1 start bit, plus 1 stop bit, a total of 119 bits. The BMC needs 119 clocks to fully read 10 bytes of the data.

It can be seen from the above that on the CPLD 41, the data transmission module 411 has the edge detection function by setting the data transmission module 411, when the signal changes, the changed signal is transmitted to the FIFO memory 412, and the BMC 42 can read the changed signal through the FIFO memory 412, there is no need to poll the register array as shown in FIG. 1, which saves communication time, reduces the resource occupation of the BMC 42, and does not lose the signal that changes (jumps) in a short time. The present disclosure establishes the communication between the first register 413 and the BMC 42 through the I$^2$C bus, it can transmit unlimited bytes in a single cycle. Furthermore, the first register 413 has only one fixed register, so compared with the register array, it only needs to transmit 1 byte of address, further saving communication time.

Those of ordinary skill in the art should realize that the above embodiments are only used to illustrate the present disclosure, but not to limit the present disclosure. As long as they are within the essential spirit of the present disclosure, the above embodiments are appropriately made and changes fall within the scope of protection of the present disclosure.

What is claimed is:

1. A complex programmable logic device (CPLD) applied to a server and comprising:
   a data transmission module configured to obtain a first signal of the server;
   a first in first out (FIFO) memory configured to obtain a changed first signal transmitted by the data transmission module when the first signal changes; and
   an inter-integrated circuit (I2C) slave configured to obtain the changed first signal transmitted by the FIFO memory, wherein a baseboard management controller (BMC) reads the changed first signal from the I2C slave through an I2C bus;
   wherein the FIFO memory is configured to output a full-state signal to the BMC when the FIFO memory is full, so that the BMC reads the changed first signal from the I2C slave through the I2C bus; wherein the FIFO memory is further configured to output an empty state signal to the BMC when the FIFO memory is empty, so that the BMC is in an idle state;
   the data transmission module comprises a memory, the memory is divided into N blocks for storing the first signal, N is a positive integer larger than 1;
   the data transmission module outputs an enable signal to the FIFO memory when detecting change in the first signal in the N blocks, so that the FIFO memory receives the N blocks when the first signal changes.

2. The complex programmable logic device of claim 1, wherein the data transmission module comprises an edge detection module, the edge detection module communicates with the memory, and the edge detection module is configured to access data stored in the memory.

3. The complex programmable logic device of claim 2, wherein the I2C slave comprises a first register, the first register is configured to store the first signal.

4. The complex programmable logic device of claim 3, wherein the first register is configured to output a read signal to the FIFO memory when the BMC receives the full-state signal, so that the first register reads the first signal from the FIFO memory.

5. A complex programmable logic device (CPLD) applied to a server and comprising:
   a data transmission module configured to obtain a first signal of the server;
   a first in first out (FIFO) memory configured to obtain a changed first signal transmitted by the data transmission module when the first signal changes; and
   an inter-integrated circuit (I2C) slave configured to obtain the changed first signal transmitted by the FIFO memory, wherein a baseboard management controller (BMC) reads the changed first signal from the I2C slave through an I2C bus;
   wherein the FIFO memory is configured to output a full-state signal to the BMC when the FIFO memory is full, so that the BMC reads the changed first signal from the I2C slave through the I2C bus; wherein the FIFO memory is further configured to output an empty state signal to the BMC when the FIFO memory is empty, so that the BMC is in an idle state;
   the data transmission module comprises a memory, the memory is divided into N blocks for storing the first signal, N is a positive integer larger than 1;
   the data transmission module outputs an enable signal to the FIFO memory when detecting change in the first signal in the N blocks, so that the FIFO memory receives the N blocks when the first signal changes.

6. The complex programmable logic device of claim 5, wherein the data transmission module comprises an edge detection module, the edge detection module communicates with the memory, and the edge detection module is configured to access data stored in the memory.

7. The complex programmable logic device of claim 6, wherein the I2C slave comprises a first register, the first register is configured to store the first signal.

8. The complex programmable logic device of claim 7, wherein the first register is configured to output a read signal to the FIFO memory when the BMC receives the full-state signal, so that the first register reads the first signal from the FIFO memory.

9. A communication method between a complex programmable logic device (CPLD) and a baseboard management controller (BMC), the communication method applied to the CPLD and comprising:
   obtaining a first signal of a server;
   detecting whether the first signal changes; and
   transmitting a changed first signal to the BMC when the first signal changes;
      outputting a full-state signal to the BMC when a first in first out (FIFO) memory of the CPLD is full, wherein the BMC reads the changed first signal from an inter-integrated circuit (I2C) slave through the I2C bus; outputting an empty state signal to the BMC when FIFO memory is empty, wherein the BMC is in an idle state;
   dividing a memory into N blocks for storing the first signal, N is a positive integer larger than 1;
   outputting an enable signal to the FIFO memory when detecting change in the first signal in the N blocks, so that the FIFO memory receives the N blocks when the first signal changes.

* * * * *